UNITED STATES PATENT OFFICE.

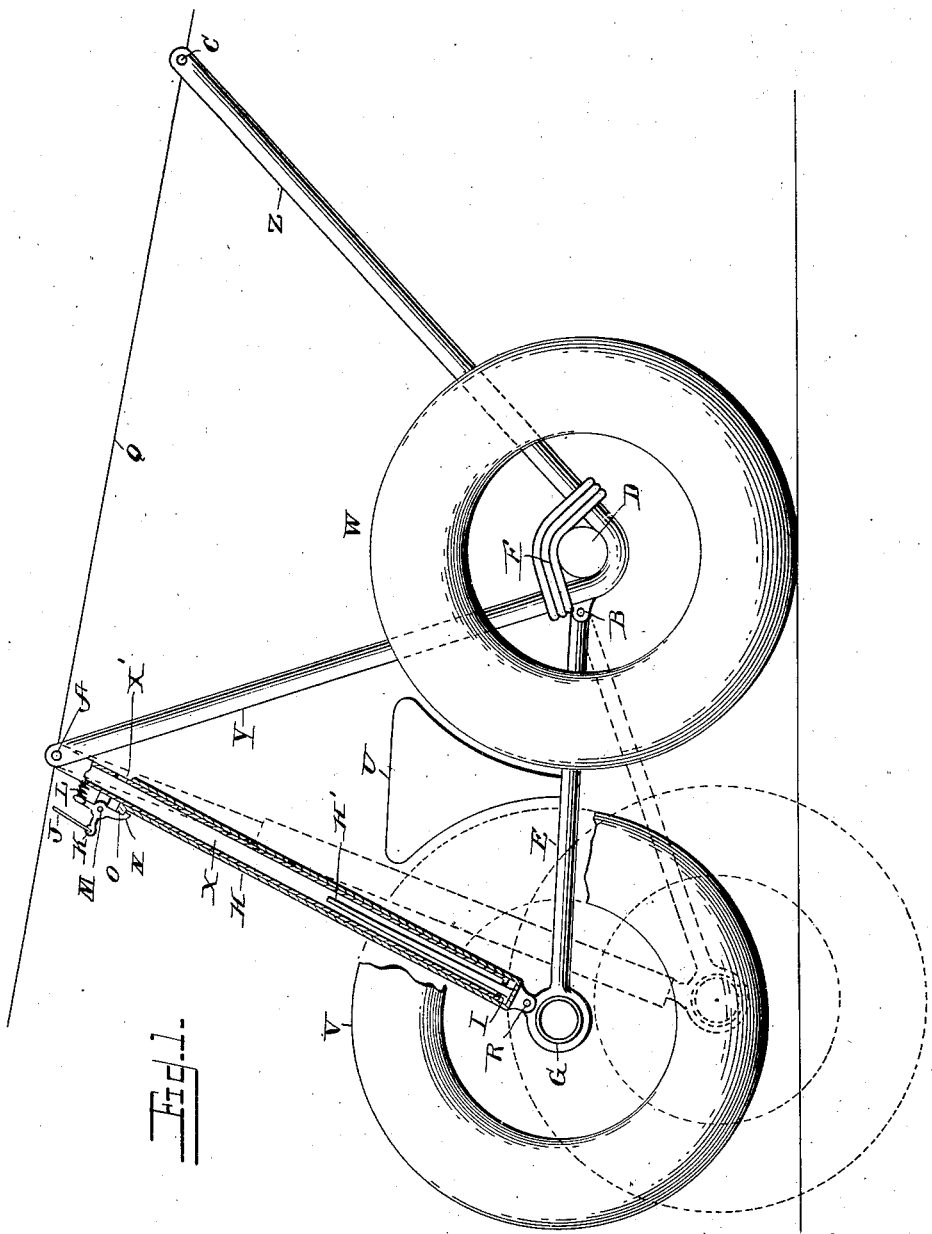

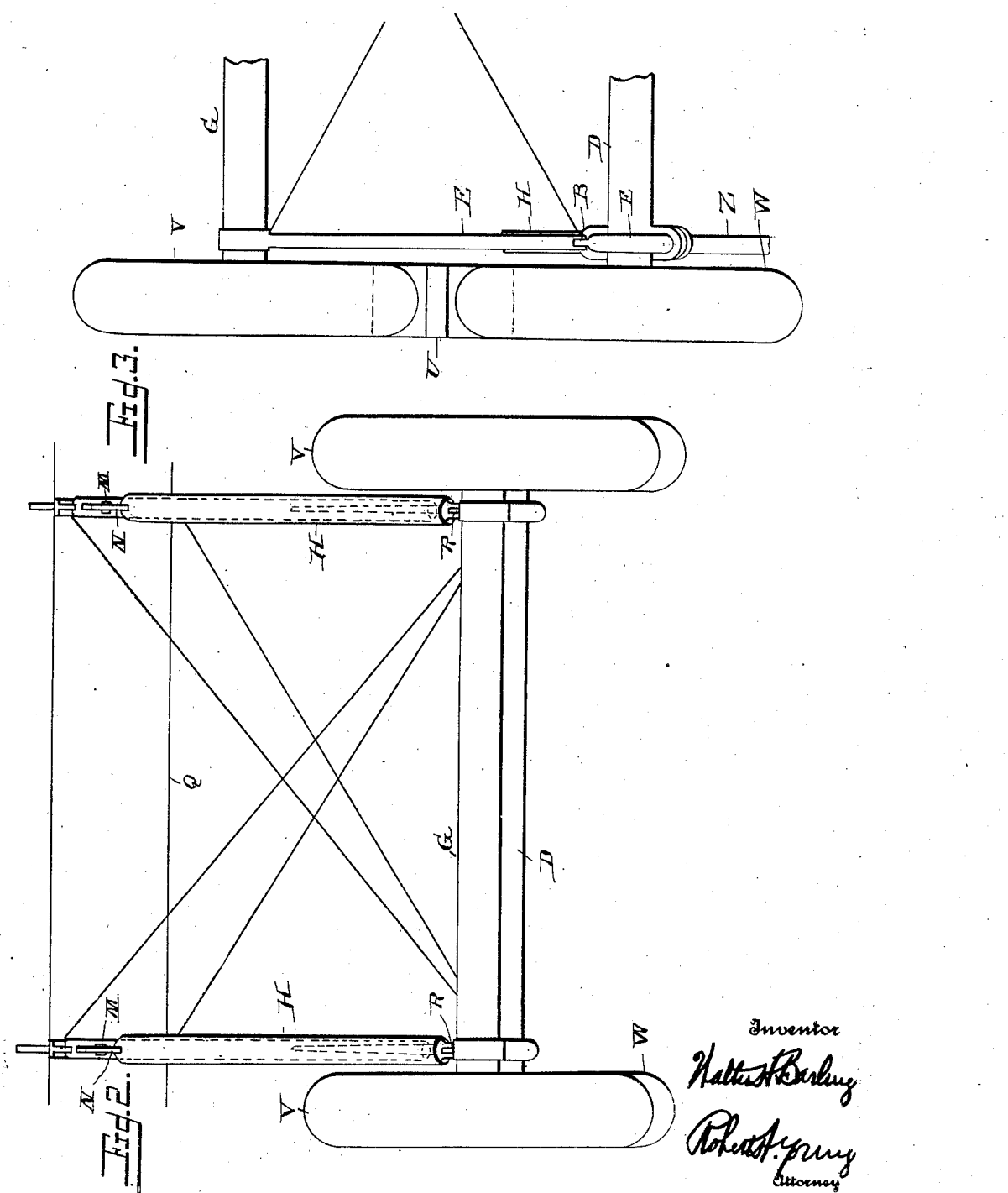

WALTER HENRY BARLING, OF HASBROUCK HEIGHTS, NEW JERSEY.

LANDING-GEAR.

1,385,770.   Specification of Letters Patent.   Patented July 26, 1921.

Application filed February 17, 1921. Serial No. 445,846.

*To all whom it may concern:*

Be it known that I, WALTER H. BARLING, a citizen of England, residing at Hasbrouck Heights, in the county of Bergen and State of New Jersey, have invented certain new and useful Improvements in Landing-Gears, of which the following is a specification.

This invention relates to aircraft landing gears in general and more particularly to that type in which dual sets of landing wheels are provided. In the present known types of landing gears it has been proposed in some instances to place auxiliary wheels forward of the main landing gear to prevent "nosing over" as in the case of extremely rough landings or landing in soft ground. In such devices the auxiliary wheels do not come into use unless the plane partially noses over. While a landing gear so arranged has been found to provide some advantages they do not meet all of the conditions encountered in landing or do not provide all of the useful functions that might be provided with a dual landing gear system.

In the design and construction of landing gears two of the principal problems are the provision of proper shock absorbing means and the location of the axle of the wheels with reference to the center of gravity of the plane. As regards shock absorbing means it is known that a shock absorber of the dash pot type absorbs shocks such as the initial shock of a rough landing and with a minimum of bouncing. Such a type, of course, is only effective for the length of time required for the passage of the fluid through the dash pot orifice. It will hence be useless as a shock absorbing means to take up the shocks of taxiing. The usual elastic band shock absorber is found very satisfactory for taxiing. As regards the positioning of the wheel axles it is desirable for the purpose of landing that the wheels should be placed far ahead of the center of gravity in order to prevent "nosing over" in the event of a rough landing or a landing made in soft ground. By so placing the landing gear it will be seen that a greater inertia will be required to move the weight of the ship acting at the center of gravity through the longer moment arm around the forwardly placed wheel axle. For taxiing it is preferred that the landing gear should be but slightly ahead of the landing wheels in order that the minimum amount of weight should rest upon the tail skid and result in a straining of the fuselage.

It is therefore my purpose to provide a landing gear consisting of dual sets of landing wheels to be placed in tandem; one set of the wheels being placed farther forward in the best position to take up shock of a "gliding landing" or to prevent "nosing over" when a landing is made in soft ground. These two forward wheels are to be provided with a dash pot type shock absorber and are to be mounted so as to be shiftable at the will of the pilot from an inoperative position to an operative one. The rear set of wheels is to be placed but very slightly forward of the center of gravity in the best possible position for taxiing and is to be provided with a shock absorber of the usual elastic band type. By the use of a landing gear so devised I will have attained all of the desired advantages heretofore discussed.

The present preferred embodiment of my invention will be found in the accompanying specification and attached drawings, in which:

Figure 1 is a side elevation of the landing gear showing in dotted lines the position when shifted;

Fig. 2 is a front elevation of the landing gear showing the attachment to the fuselage or wing; and Fig. 3 is a bottom plan view of the landing gear showing the two wheels of one side.

As shown in the drawings, Q represents the fuselage or wing, of an aircraft, to which are attached at A and C on one side three landing gear struts X, Y and Z, strut X being pivotally connected to A and adapted to swing thereon. V and W are wheels having axles G and D respectively and fairing U therebetween for the purpose of streamlining same. Attached to stationary struts Y and Z and snugly surrounding axle D, are elastic cords F, serving as a hollow member H pivotally attached at R to the axle G. The strut X pivotally secured to A terminates in a piston head, I, tightly fitting within the hollow member H and slidable therein to provide a shock absorber of the dash pot type for the forward wheels V.

Near its upper end the member H has a notch O formed therein adapted to be engaged by a safety catch N pivoted on the strut X at M operable by a cord J attached at K and held by spring L. Connecting the axles D and G is a strut E fixedly secured to G and pivotally secured to D at B and adapted to swing thereon. Fig. 1 shows in full lines the landing gear in "take-off" position with the forward wheels V in inoperative position, and in dotted lines shows them in operative position for landing.

When about to land, the pilot pulls the cord J, releasing the catch N from the notch O, thus allowing the member H, by reason of the weight of the wheel V to which it is attached, to slide downwardly upon the strut X, by strut E swinging upon pivots R and B.

The wheels V, when shifted to operative position, forward and lower than the main wheels W, will receive the initial shock of landing. By this construction it will be seen that a point of support, i. e., the axle of the forward landing wheels, is provided at a point farther forward of the center of gravity than that of the wheels W which were used for taxiing. It will be seen that by this construction in an initial landing there will be a greater amount of weight placed upon the tail skid which will cause it to drag heavily and assist in bringing the plane to a stop. It will further be noted that with the wheels so placed it will require a great deal more inertia to cause the weight of the airplane acting at the center of gravity to move through the necessarily longer arc around the axle of the forward wheels such as will be necessary for the plane to "nose over." In addition to these advantages the minimum possible amount of shock of landing will have been transmitted to the fuselage by virtue of the fact that the forward wheels, as stated, are provided with a dash pot type of shock absorber. To provide an effective cushioning means for the above described dash pot shock absorber a tapered circular pin H' is mounted integrally and concentrically within the hollow landing gear strut H and at its lower extremity. The taper pin or its equivalent is used so that by varying the shape of the pin any desired variation in the rate of contraction of the landing gear (upon landing) may be obtained.

The dash pot shock absorber, as stated, is found to be most effective for absorbing shocks, due to, as in the present case, vertical thrust; and hence it is very efficient for the purpose of taking up initial shock of landing. It will be further noted that such a type of shock absorber greatly decreases the tendency of the plane to bound upon landing. However, as a cushioning fluid in the dash pot would rapidly be transferring past the piston in the act of landing this form of shock absorber would be of no value for use in taxiing. The catch O, in fact, will lock and hold the front wheels from the ground when taxiing. The main or rear wheels are therefore provided with the usual elastic cord shock absorbers which are found to be very satisfactory for taxiing, being well adapted to absorb thrust and strain as encountered in taxiing. The provision of the two types of shock absorbers in one landing gear construction is of great importance as the forward wheels are adapted to receive the majority of shock when landing are provided with dash pot shock absorbers best suited for that purpose, and the main wheels, by reason of the gradual loss of effectiveness of the dash pot type after having landed are adapted to receive the entire shocks encountered when taxiing and are provided with elastic cord type shock absorbers which has been found to be best suited for that purpose. A further feature provided is that by locking the forward wheels V in their inoperative position the aircraft may be tilted forward and balanced on the main and forward wheels alone for the purpose of removing or repairing any portion of the rear part of the fuselage. This feature also provides for a minimum of space in hangars in case of a separable unit fuselage.

Operation: The operation of my device would seem to be as follows—When it is desired to take-off the forward wheels are locked in their inoperative position, the take-off is made, on the rear or main landing wheels. When about to descend the control lever is moved so that the forward wheels, by reason of their weight, gradually extend to an operative position. Upon landing it will be seen that the forward wheels will touch the ground first and take-up the initial shock as the fluid gradually passes the piston through the dash pot orifice. The weight of the plane will then be taken up by the rear wheels.

Having described my invention, I claim:

1. In an aircraft, a landing gear assembly comprising two landing gear members, one of said landing gear members being attached at a point but slightly forward of the center of gravity of the aircraft and the second landing gear member being placed in a position considerably forward of said first named landing gear member, said second named landing gear member being normally held in inoperative position and adapted to be shifted to an operative position for landing.

2. In an aircraft, a fuselage, a landing gear assembly attached to said fuselage, said landing gear assembly comprising two landing gear members, one of said landing gear members being attached to the aircraft at a point but slightly forward of the center of gravity thereon and the second landing gear member being attached to the aircraft at a point forward of said main landing gear member, said last named landing gear member being normally held in a position above said first named landing gear member when in inoperative position, and means for shifting said forward landing gear member to a lower or inoperative position for landing.

3. In an aircraft, a landing gear assembly comprising forward and rear landing gear members, means operable at the will of the pilot for shifting said forward landing gear members from an inoperative to an operative position for the purpose described.

4. In an aircraft, a fuselage, a landing gear assembly comprising forward and rear landing gear members, said rear landing gear members being in fixed relation to said fuselage and said forward landing gear members in shiftable relation thereto, and means operable at the will of the pilot for shifting said forward landing gear member to an operative position.

5. In an aircraft, a landing gear assembly attached thereto, said landing gear assembly comprising forward and rear landing gear members, said rear landing gear members being attached in fixed relation to the fuselage at a point slightly forward of the center of gravity thereof, and said forward landing gear members attached in shiftable relation to said fuselage at a point forward of the main landing gear member.

6. In an aircraft, a landing gear assembly attached thereto, said landing gear assembly comprising forward and rear landing gear members, said rear landing gear member being attached in fixed relation to the fuselage at a point slightly forward of the center of gravity thereof, said forward landing gear member attached in shiftable relation to said fuselage at a point forward of said rear landing gear member, said rear landing gear member being provided with the usual type of elastic shock absorber, said forward landing gear member being provided with a shock absorber of the dash pot type.

In testimony whereof I have affixed my signature.

WALTER HENRY BARLING.